United States Patent
Kong et al.

(10) Patent No.: US 10,851,721 B2
(45) Date of Patent: Dec. 1, 2020

(54) GARDEN TOOL

(71) Applicant: SUZHOU CLEVA PRECISION MACHINERY & TECHNOLOGY CO., LTD., Jiangsu (CN)

(72) Inventors: Zhao Kong, Jiangsu (CN); Ning Guo, Jiangsu (CN); Xiaoping Cai, Jiangsu (CN); Fei Chen, Jiangsu (CN); Bin Cao, Jiangsu (CN)

(73) Assignee: Suzhou Cleva Precision Machinery & Technology, Co., Ltd., Suzhou (CN)

( * ) Notice: Subject to any disclaimer, the term of this patent is extended or adjusted under 35 U.S.C. 154(b) by 159 days.

(21) Appl. No.: 16/070,421

(22) PCT Filed: Jan. 13, 2017

(86) PCT No.: PCT/CN2017/071175
§ 371 (c)(1),
(2) Date: Jul. 16, 2018

(87) PCT Pub. No.: WO2017/121395
PCT Pub. Date: Jul. 20, 2017

(65) Prior Publication Data
US 2019/0032583 A1    Jan. 31, 2019

(30) Foreign Application Priority Data

Jan. 15, 2016 (CN) .......................... 2016 1 0024372
Jan. 15, 2016 (CN) .......................... 2016 1 0024655

(51) Int. Cl.
*F02D 41/00* (2006.01)
*A01D 34/416* (2006.01)
(Continued)

(52) U.S. Cl.
CPC ....... *F02D 41/0025* (2013.01); *A01D 34/416* (2013.01); *A01D 69/00* (2013.01);
(Continued)

(58) Field of Classification Search
CPC .. A01D 2101/00; A01D 69/00; A01D 34/416; F02N 11/08; F02D 2009/0205;
(Continued)

(56) References Cited

U.S. PATENT DOCUMENTS 3,620,200 A * 11/1971 Stephens ................... F02P 7/03
                                                                                           123/620
4,250,842 A * 2/1981 Sutton .................... F02M 69/04
                                                                                           123/438
(Continued)

FOREIGN PATENT DOCUMENTS

| | | |
|---|---|---|
| CN | 1333423 A | 1/2002 |
| CN | 1793639 A | 6/2006 |

(Continued)

OTHER PUBLICATIONS

International Search Report for Application No. PCT/CN2017/071175, dated Mar. 31, 2017.
(Continued)

*Primary Examiner* — Andrew M Tecco
*Assistant Examiner* — Nicholas E Igbokwe
(74) *Attorney, Agent, or Firm* — JK Intellectual Property Law, PA

(57) ABSTRACT

A garden tool includes a gasoline engine and a power source, the gasoline engine including a fuel supply system and an ignition system. The garden tool may further include a control system with at least one sensor used for collecting a working condition signal of the gasoline engine and a controller used for receiving the working condition signal and controlling the fuel supply system and/or the ignition system according to the working condition signal received. The power source may provide a power supply for the fuel supply system, the ignition system, and the control system through the controller.

15 Claims, 12 Drawing Sheets

(51) Int. Cl.
*A01D 69/00* (2006.01)
*F02D 33/00* (2006.01)
*F02N 11/08* (2006.01)
*F02D 9/02* (2006.01)
*F02D 11/10* (2006.01)
*F02D 11/02* (2006.01)
*F02D 41/30* (2006.01)
*A01D 101/00* (2006.01)

(52) U.S. Cl.
CPC ............... *F02D 9/02* (2013.01); *F02D 11/02* (2013.01); *F02D 11/10* (2013.01); *F02D 33/006* (2013.01); *F02N 11/08* (2013.01); *A01D 2101/00* (2013.01); *F02D 41/0002* (2013.01); *F02D 41/3005* (2013.01); *F02D 2009/0205* (2013.01); *F02D 2009/0225* (2013.01); *F02D 2011/101* (2013.01); *F02D 2200/0414* (2013.01); *F02D 2400/06* (2013.01)

(58) Field of Classification Search
CPC .. F02D 2009/0225; F02D 11/10; F02D 11/02; F02D 41/067; F02D 41/065; F02D 2200/021; F02M 1/02; F02M 1/10
See application file for complete search history.

(56) References Cited

U.S. PATENT DOCUMENTS

| | | | | |
|---|---|---|---|---|
| 5,056,309 | A * | 10/1991 | Linder | F02M 26/20 123/568.17 |
| 5,383,824 | A * | 1/1995 | Runge | B60W 10/06 477/107 |
| 7,493,889 | B2 | 2/2009 | Nickel et al. | |
| 7,525,287 | B2 | 4/2009 | Miyashita et al. | |
| 9,049,816 | B2 | 6/2015 | Ito et al. | |
| 10,371,044 | B2 | 8/2019 | Karrar | |
| 2006/0042574 | A1 | 3/2006 | Nishikawa | |
| 2006/0225701 | A1 * | 10/2006 | Beer | F02D 41/065 123/406.45 |
| 2007/0256668 | A1 * | 11/2007 | Bellistri | F02D 41/34 123/478 |
| 2009/0020094 | A1 | 1/2009 | Ono et al. | |
| 2009/0194726 | A1 | 8/2009 | Aihara et al. | |
| 2009/0293828 | A1 * | 12/2009 | Iwata | F02D 41/067 123/179.18 |
| 2011/0146610 | A1 | 6/2011 | Reichler et al. | |
| 2013/0111864 | A1 * | 5/2013 | Hansen | F02N 11/12 56/10.8 |
| 2013/0152733 | A1 * | 6/2013 | Ke | F02N 11/00 74/7 C |
| 2014/0299089 | A1 * | 10/2014 | Koenen | F04B 17/05 123/179.28 |
| 2014/0318488 | A1 | 10/2014 | Kawagoe et al. | |
| 2014/0366830 | A1 | 12/2014 | Kawano et al. | |
| 2016/0102648 | A1 | 4/2016 | Nakayama et al. | |
| 2019/0024612 | A1 | 1/2019 | Kong et al. | |
| 2019/0024620 | A1 | 1/2019 | Kong et al. | |

FOREIGN PATENT DOCUMENTS

| | | |
|---|---|---|
| CN | 101126356 A | 2/2008 |
| CN | 101280739 A | 10/2008 |
| CN | 101363380 A | 2/2009 |
| CN | 202047923 U | 11/2011 |
| CN | 102480915 A | 5/2012 |
| CN | 103527686 | 1/2014 |
| CN | 103758671 A | 4/2014 |
| CN | 105247203 A | 1/2016 |
| CN | 105464875 A | 4/2016 |
| CN | 105484876 A | 4/2016 |
| CN | 105484899 A | 4/2016 |
| CN | 105508117 A | 4/2016 |
| CN | 105545562 A | 5/2016 |
| CN | 105673290 A | 6/2016 |
| CN | 205370829 U | 7/2016 |
| CN | 205503286 U | 8/2016 |
| CN | 205638728 U | 10/2016 |
| CN | 205638760 U | 10/2016 |
| CN | 205638761 U | 10/2016 |
| CN | 205638762 U | 10/2016 |
| EP | 2108812 A1 | 10/2009 |
| EP | 2474218 A1 | 7/2012 |
| JP | 2002227753 A | 8/2002 |

OTHER PUBLICATIONS

International Search Report for International Application No. PCT/CN2017/071178, dated Apr. 10, 2017.

European Search Report, for Application No. EP 20153836, dated Apr. 21, 2020.

* cited by examiner

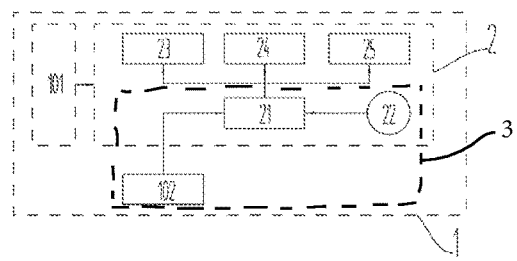
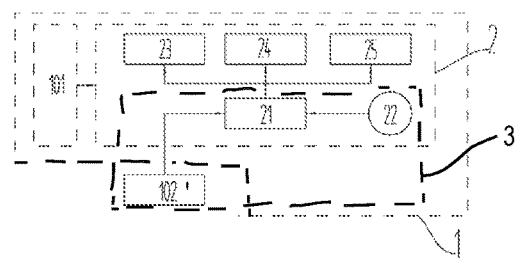
FIG. 1A  FIG. 1B
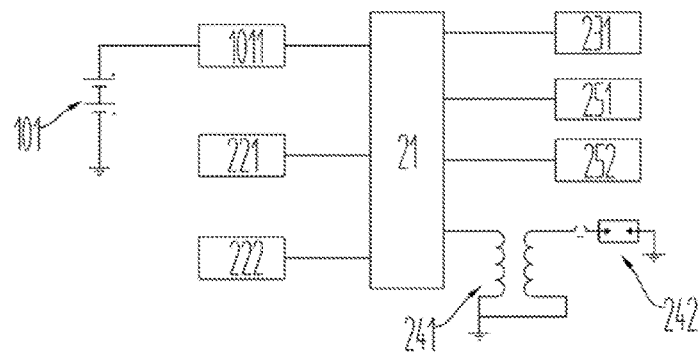
FIG. 2
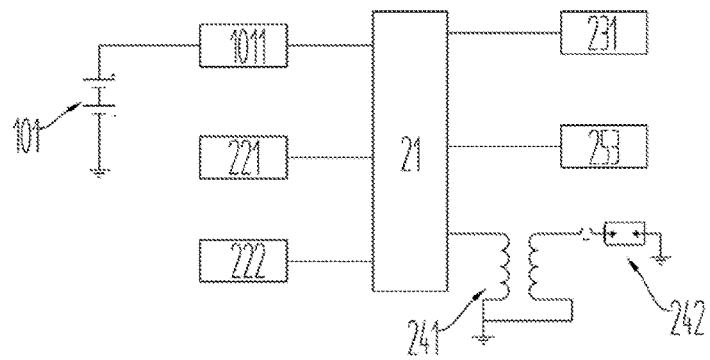
FIG. 3

GARDEN TOOL

CROSS-REFERENCE TO RELATED APPLICATIONS

This application is a national stage of International Application No. PCT/CN2017/071175, filed on Jan. 13, 2017 which claims priority to CN Patent Application No. 201610024372.7, filed on Jan. 15, 2016, and CN Patent Application No. 201610024655.1, filed on Jan. 15, 2016. All of the aforementioned applications are hereby incorporated by reference in their entireties.

TECHNICAL FIELD

The present disclosure relates to a garden tool, and especially relates to a garden tool using a gasoline engine as a power source.

BACKGROUND

According to the type of power source used, garden tools can be divided into electric garden tools and internal combustion engine garden tools. In the internal combustion engine garden tools, gasoline engine garden tools are mostly used. The gasoline engine garden tools are mainly manually controlled by users' operations. For example, when a gasoline engine is cold started, since the gasoline engine is in a low temperature state, a user is required to manually draw a starter rope to run a crankshaft of the gasoline engine, and cooperatively control opening and closing of a fuel throttle and a choker of the gasoline engine at the same time. This is very demanding for users' operation skills, or there may be faults like misfire occurring with the gasoline engine. Although in the prior art a starter motor has been used to instead the starter rope, the fuel throttle and the choker of the gasoline engine are still hard to be cooperatively controlled. Moreover, a currently widely used ignition system includes a magneto, an igniter, and a magnet mounted on a flywheel. Ignition voltage is generated by the interaction of the magnet and the magneto, and causes the igniter to operate. However, the ignition system has following disadvantages: since ignition voltage is proportional to a rotational speed of the flywheel, when the rotational speed is relatively low, ignition power is also relatively low. Especially in the engine starting phase, due to the low rotational speed, the ignition power cannot generate a large spark required. As a result, the garden tools are difficult to be started and the users' experience is affected. In more complicated working environments, the garden tools may not always be maintained in the best working condition. When a user lacks operation experiences and skills, malfunctions are easily to be caused. Moreover, garden tools equipped with a starter motor are usually equipped with a battery pack to power the starter motor. However, the starter motor does not have to work during normal working of the garden tools, thus the battery pack is also idle during normal working of the garden tools. It can be seen that the battery pack actually adds product cost.

SUMMARY

Embodiments of the present disclosure are directed to providing a gasoline engine garden tool, which can be controlled easily and conveniently through a controller.

According to an aspect of the present disclosure, a garden tool is provided, including a gasoline engine, the gasoline engine including a fuel supply system and an ignition system;

wherein the garden tool further includes a control system, the control system including at least one sensor used for collecting a working condition signal of the gasoline engine and a controller used for receiving the working condition signal and controlling the fuel supply system and/or the ignition system according to the working condition signals received.

In an embodiment, the control system includes a first sensor used for measuring a first ambient temperature signal, and the controller adjusts a fuel supply amount and an air-fuel ratio according to the first ambient temperature signal;

wherein the fuel supply system includes a carburetor and an automatic choke control unit, the carburetor includes an intake passage, the automatic choke control unit includes a choke valve used for at least partially closing the intake passage and a choke actuator used for driving movement of the choke valve, and the controller controls the movement of the choke valve through the choke actuator so as to control an air amount throughout the carburetor;

wherein the fuel supply system further includes an automatic fuel throttle control unit, the automatic fuel throttle control unit includes a throttle used for at least partially closing the intake passage and a throttle actuator used for driving movement of the throttle, and the controller controls the movement of the throttle through the throttle actuator so as to control a fuel amount throughout the carburetor.

In an embodiment, the fuel supply system includes an electric fuel injector, the control system includes a first sensor used for measuring a first ambient temperature signal, and the controller adjusts a fuel injection amount and an air-fuel ratio according to the first ambient temperature signal.

In an embodiment, the control system includes a second sensor used for measuring a rotational speed signal of the gasoline engine and a third sensor used for measuring a second ambient temperature signal, the controller adjusts ignition voltage and/or an ignition advance angle according to the rotational speed signal and the second ambient temperature signal, the ignition system includes a boosting device and a spark plug connected to an output end of the boosting device, the gasoline engine further includes a flywheel, and the second sensor is disposed on the flywheel.

In an embodiment, the gasoline engine further includes a starting system, the control system further includes an operator used for being physically operated by a user to issue a user command signal, and the controller receives the user command signal and performs at least one of following control actions on the gasoline engine: starting, flameout, and adjusting a fuel supply amount based on the user command signal received.

In an embodiment, the starting system includes a starter motor, a speed reduction unit and a clutch unit, and the gasoline engine includes a crankshaft; wherein when the gasoline engine is started, the starter motor drives the crankshaft to rotate through the speed reduction unit; wherein the clutch unit is used for one-way transmitting torque of the starter motor and is disposed between the speed reduction unit and the crankshaft; wherein the speed reduction unit is a gear set including an input gear, an output gear and at least one transmission gear disposed between the input gear and the output gear; wherein when the gasoline engine is started, an output shaft of the starter motor drives the input gear to rotate at a same speed, the input gear and the output gear meshes with each other and perform a speed reduction movement, and the output gear drives the crankshaft to rotate at a same speed through the clutch unit.

In an embodiment, the speed reduction unit further includes an energy storage member used for storing kinetic energy of the starter motor and releasing energy to the crankshaft.

In an embodiment, the energy storage member is a coil spring or a torsion spring mounted on the output gear, and a free end of the energy storage member is able to be rotated relatively to another free end of the energy storage member as the output gear being rotated.

According to another aspect of the present disclosure, a garden tool is provided, including a gasoline engine and a lithium-ion battery, the gasoline engine including a fuel supply system and an ignition system;

wherein the garden tool further includes a control system, the control system including at least one sensor used for collecting a working condition signal of the gasoline engine and a controller used for receiving the working condition signal and controlling the fuel supply system and/or the ignition system according to the working condition signal received; wherein the lithium-ion battery is connected to the controller and provides power supply for the fuel supply system, the ignition system, and the control system through the controller.

In an embodiment, the gasoline engine includes an engine block, the fuel supply system and the ignition system are disposed in the engine block, and the lithium-ion battery pack is detachably mounted on the engine block.

In an embodiment, the ignition system includes a boosting device, used for raising an output voltage of the power source to an ignition voltage.

In an embodiment, the output voltage of the power source is 6 V to 12 V, and the ignition voltage is 10,000V to 30,000V; or the output voltage of the power source is 6 V to 12 V, and the ignition voltage is 15,000V to 30,000V.

In an embodiment, the boosting device includes multi-stage boosting modules, and the output voltage of the power source is raised to the ignition voltage by the multi-stage boosting modules.

In an embodiment, the boosting device includes a primary boosting module and a secondary boosting module, the primary boosting module raises the output voltage of the power source to 200 V-250 V, and the secondary boosting module raises the output voltage from 220V to 250V to the ignition voltage.

According to another aspect of the present disclosure, a garden tool is provided, including a gasoline engine and a lithium-ion battery pack, the gasoline engine including a starting system, a fuel supply system and an ignition system;

wherein the garden tool further includes a control system, the control system including at least one sensor used for collecting a working condition signal of the gasoline engine, an operator used for being physically operated by a user to issue a user command signal, and a controller used for receiving the working condition signal and controlling the fuel supply system and/or the ignition system according to the working condition signal received; wherein the controller also receives the user command signal and performs at least one of following control actions on the gasoline engine: starting, flameout, and adjusting a fuel supply amount based on the user command signal received; wherein the lithium-ion battery pack is connected to the controller, and provides power supply for the fuel supply system, the ignition system, and the control system through the controller.

In an embodiment, the gasoline engine includes a crankshaft, and the starting system includes a starter motor and a speed reduction unit; wherein when the gasoline engine starting, the starter motor drives the crankshaft to rotate through the speed reduction unit; wherein the lithium-ion battery pack is disposed at a side of the speed reduction unit, the crankshaft is disposed at another side of the speed reduction unit and relative to the lithium-ion battery pack, and the controller is disposed under the power source.

In an embodiment, the garden tool according further including a power section, a handle section and a linkage section; wherein the controller is disposed in the power section, and the operator is disposed in the handle section and/or the linkage section.

In an embodiment, the operator is separated from the garden tool.

In an embodiment, the operator includes a control panel and at least two operation keys disposed on the control panel, and a convex portion is provided between two adjacent operation keys.

In an embodiment, the operator communicates with the controller through a communication wire or wireless signals.

In an embodiment, the garden tool is a hand-held garden tool.

In an embodiment, the garden tool is a walk-behind garden tool.

In an embodiment, the garden tool is a backpack-type garden tool.

Embodiments of the present disclosure have the following beneficial effects: by controlling a gasoline engine garden tool through a controller and using a battery pack to supply power for the controller, operation of the gasoline engine garden tool can be more convenient and more easy, and a concentrated operation device (e.g. a control panel) can be used to control the gasoline engine garden tool conveniently. The use of the controller can improve the cooperation of various systems, so that the gasoline engine garden tool can be maintained in the best working condition. For example, when the gasoline engine garden tool starting, the controller can perform unified control of a starting system, a fuel supply system and an ignition system, according to commands issued by a user and the working condition signal collected by sensors, so that optimal matching parameters can be achieved among the systems, and the parameters can be automatically adjusted according to changes of working conditions. In the prior art, since a battery pack of a prior electric start gasoline engine garden tool only supplies power for the starting system during a starting phase, and the ignition system gets power from an additional generator during a normal working phase, utilization of the battery pack is extremely low and product cost is increased. However in the present disclosure, a single battery pack is used to power the entire gasoline engine garden tool including the starting system and the ignition system, which improves the utilization of the battery pack and reduces the product cost.

BRIEF DESCRIPTION OF DRAWINGS

FIG. 1A is a structural diagram illustrating a control structure of a garden tool in an embodiment of the present disclosure.

FIG. 1B is a structural diagram illustrating a control structure of a garden tool in an alternate embodiment of the present disclosure.

FIG. 2 is a structural diagram illustrating a control structure of a garden tool in another embodiment of the present disclosure.

FIG. 3 is a structural diagram illustrating a control structure of a garden tool in another embodiment of the present disclosure.

DETAILED DESCRIPTION

Figure 4:
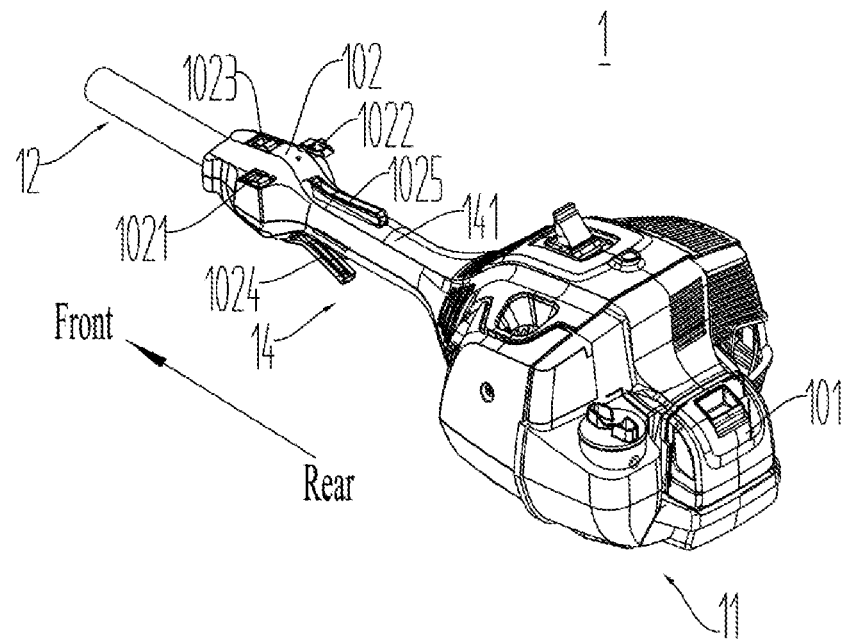
FIG. 4 is a structural diagram of a garden tool in an embodiment of the present disclosure.

The disclosure will be described in more detail below with reference to the detailed description of embodiments shown in the drawings. However, these embodiments do not limit the present disclosure, based on the embodiments, any modifications, changes in structure, method or function by those skilled in the art, are within the protection scope of the present disclosure.

According to FIGS. 1A, 1B, 2 and 4 to 19, an embodiment of the present disclosure provides a garden tool 1. The garden tool 1 includes a power section 11, a linkage section 12, a working section 13 and a handle section 14. In an embodiment, the garden tool 1 may be a grass trimmer. Of course, in other embodiments, the garden tool 1 may be a hand-held garden tool, such as a hand-held chain saw, a hand-held blower or the like. Or, the garden tool 1 may be a walk-behind garden tool, such as a lawn mower. The garden tool 1 may also be a backpack-type grass trimmer, a backpack-type chain saws, backpack-type blowers and the like. For convenience of description, a direction along an axis of the grass trimmer and away from a user using the grass trimmer is defined as a "front" direction. The power section 11 includes a power section casing 111, and the power section casing 111 extends forward to form the handle section 14. An end of the linkage section 12 is connected to the handle section 14, and the other end of the linkage section 12 is connected to the working section 13, and a power transmission device (not shown in the figures) is included in the linkage section 12 to transmit the torque output by the power section 11 to the working section 13. In an embodiment, a gasoline engine 2 is included in the power section casing 111. The gasoline engine 2 includes an engine block 201, a fuel tank 2011, a cylinder 2022, a piston 203, a crankshaft 204 and a crankcase 2041. A flywheel 243 connected to a front end of the crankshaft 204 and the structure of the gasoline engine 2 are prior arts and will not be described in detail. When the grass trimmer is in operation, fuel in the cylinder 2022 is combusted to drive the piston 203 to move, and reciprocating motion of the piston 203 is converted into continuous rotation of the crankshaft 204 by the connecting rod. The rotation of the crankshaft 204 is transmitted to the power section 11 through the power transmission device. The power unit 11 includes a cutting line or a blade, and the power transmission device transmits the rotation of the crankshaft 204 to the cutting line or the blade to perform grass cutting.

Figure 5:
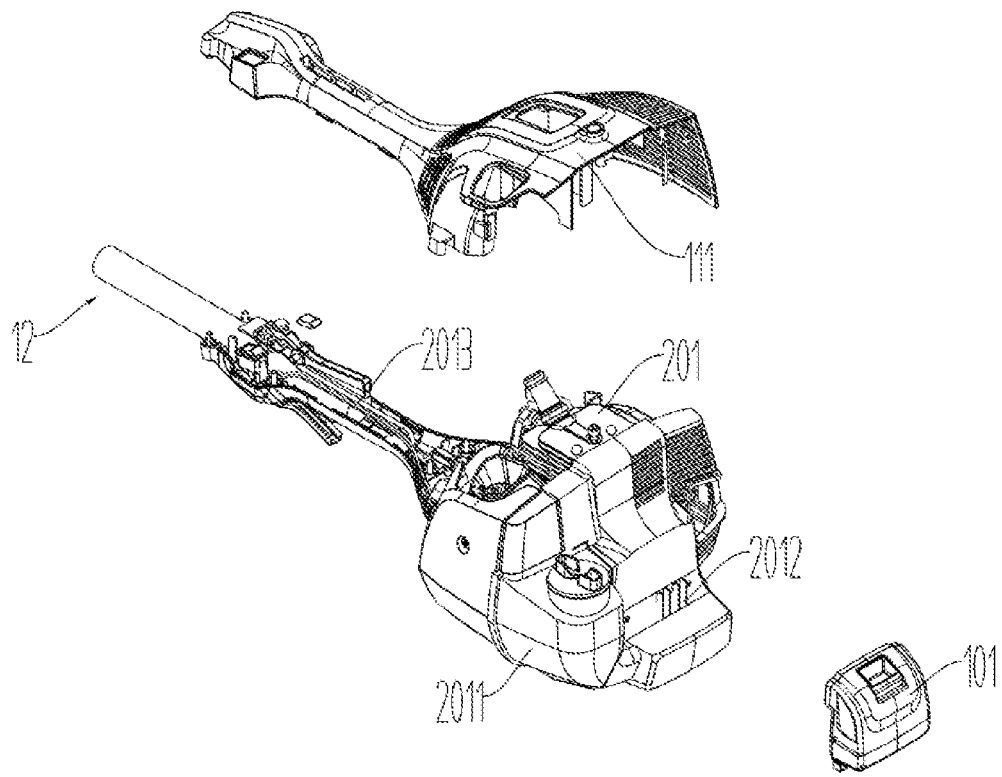
FIG. 5 is an exploded view of FIG. 4.
Figure 6:
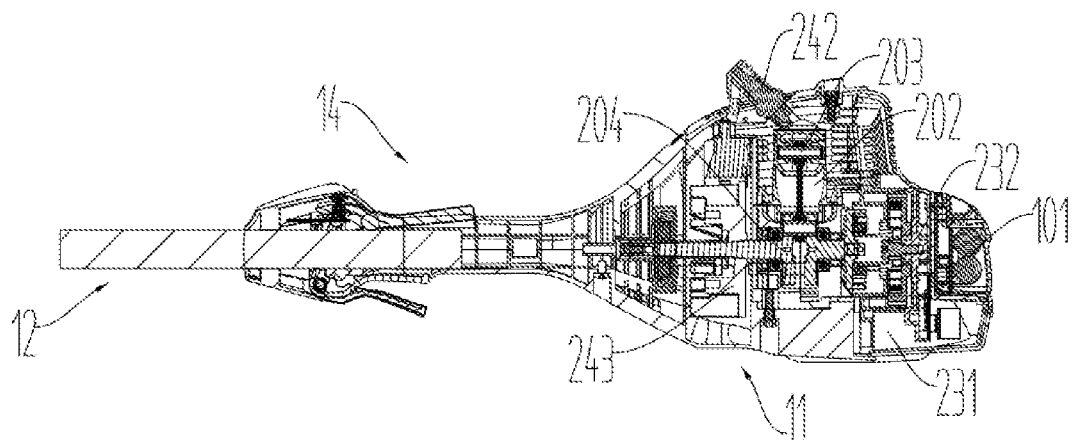
FIG. 6 is a longitudinal sectional view of FIG. 4.
Figure 7:
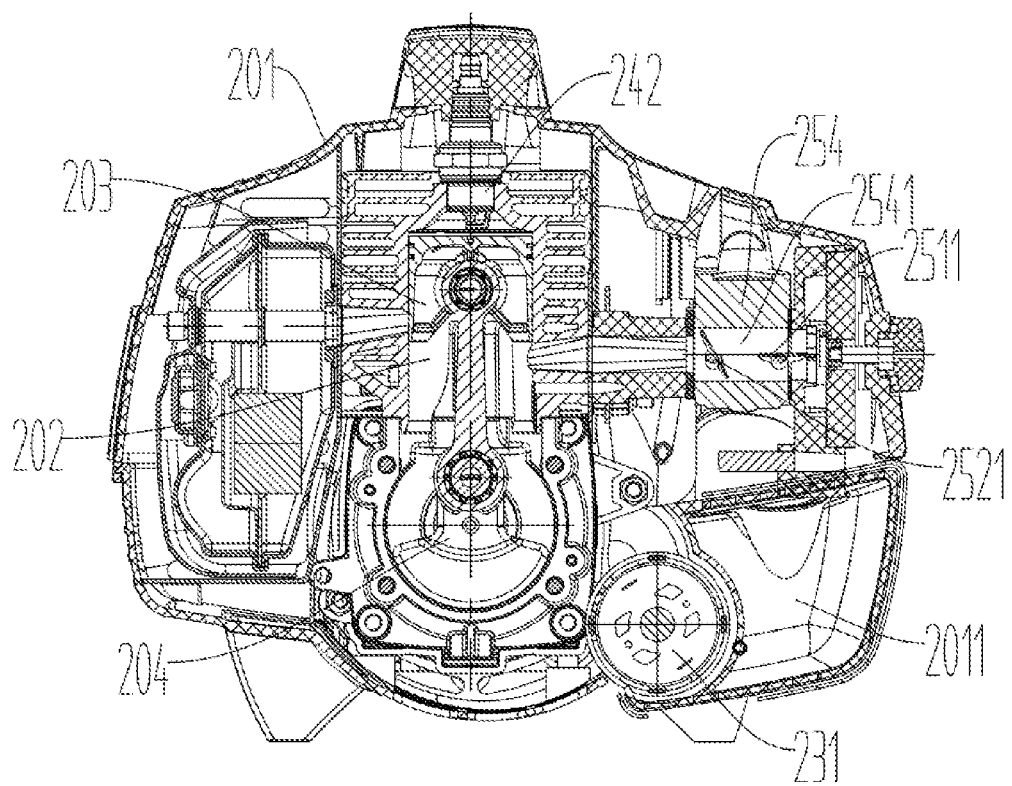
FIG. 7 is a transverse sectional view illustrating a structure of a gasoline engine in FIG. 4.
Figure 8:
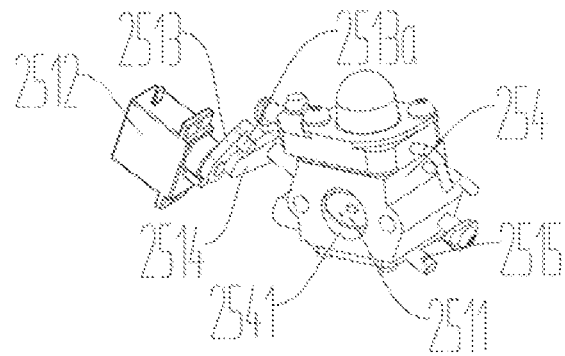
FIG. 8 is a structural diagram illustrating a structure of an automatic choke control unit in FIG. 7.
Figure 9:
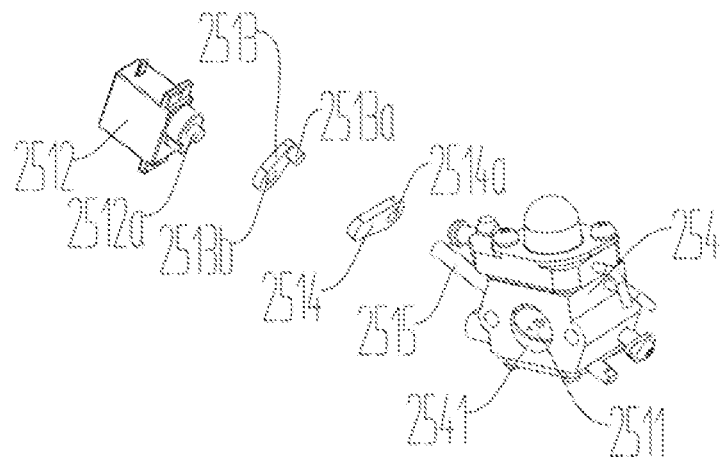
FIG. 9 is an exploded view of FIG. 8.
Figure 10:
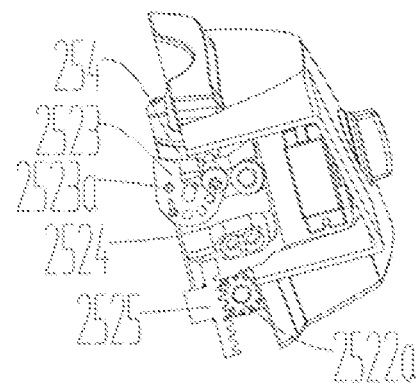
FIG. 10 is a structural diagram illustrating a structure of the automatic fuel throttle control unit in FIG. 7.
Figure 11:
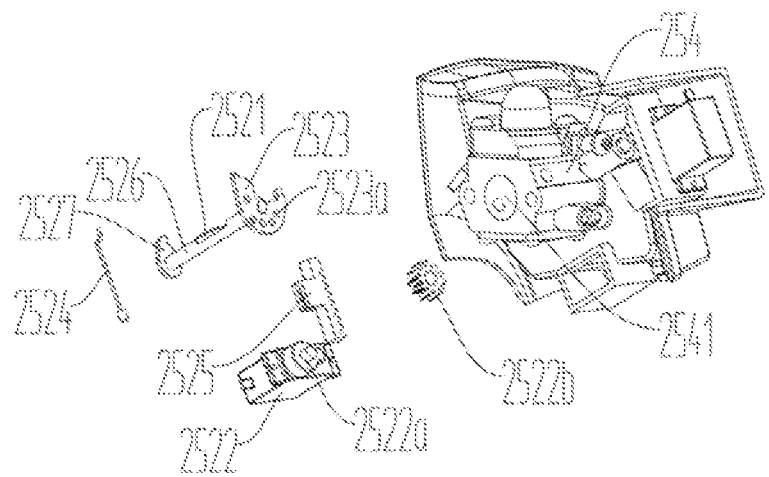
FIG. 11 is an exploded view of FIG. 10.

In an embodiment of the present disclosure, according to FIGS. 1A and 1B, the grass trimmer includes a control system 3. The control system 3 includes a controller 21, at least one sensor 22 and an operator 102/102'. The gasoline engine 2 further includes a starting system 23, an ignition system 24 and a fuel supply system 25, three of which are disposed in the engine block 201. The sensor 22 collects at least one working condition signal of the grass trimmer, and in particular collects at least one working condition signal of the gasoline engine 2. The operator 102/102' is physically operated by a user to issue at least one user command signal for controlling the grass trimmer, and the controller 21 receives the working condition signal and controls the ignition system 24 and the fuel supply system 25 according to the working condition signal received. The controller 21 also receives the user command signal and performs at least one of following control actions on the grass trimmer: starting, flameout, and adjusting a fuel supply amount, based on the user command signal received. In an embodiment, the controller 21 is disposed in the power unit casing 111, preferably disposed on the gasoline engine 2. In another embodiment, the controller 21 may also be disposed elsewhere in the grass trimmer. In an embodiment, the operator 102 is disposed separately from the controller 21. Specifically, as shown in FIGS. 4 to 6, the controller 21 is disposed in the power unit casing 111, and the operator 102 is disposed at the front end of the handle section 14. Preferably, the handle section 14 includes a grip portion 141, and the operator 102 is disposed in front of the grip portion 141. The controller 21 and the operator 102 are connected by a communication wire 2012. In another embodiment (FIG. 1A), the controller 21 and the operator 102 are equipped with wireless communication devices, and the controller 21 and the operator 102 communicate with each other through wireless signals. In another embodiment (FIG. 1B), the operator 102' is separately disposed from the grass trimmer, i.e., the operator 102' may be disposed on a separate remote control that communicates with the controller 21 through a communication wire or wireless signals. Alternatively, the operator 102' may be an independent intelligent terminal, such as a desktop computer or a mobile terminal (like a mobile phone, a laptop, a tablet, etc.), activating a user operation instruction through a software program, and performing communication through a communication wire or wireless signals.

In an embodiment of the present disclosure, the grass trimmer may further include a detachably connected DC (direct current) power source 101. Preferably, the DC power source 101 may be rechargeable a lithium-ion battery pack. A single DC power source 101 is used to power the entire grass trimmer through the controller 21. A power supply mounting section 1111 is disposed on the power unit casing 111, the DC power source 101 is detachably mounted to the power source mounting portion 1111, and the DC power source 101 is electrically connected to the controller 21. A power module 1011 is further included between the DC power source 101 and the controller 21 for regulating voltage and/or current of the DC power source 101.

In an embodiment of the present disclosure, as shown in FIG. 4, the operator 102 includes a first operation key 1021, a second operation key 1022, a third operation key 1023, a fourth operation key 1024 and a fifth operation key 1025. The first operation key 1021, the second operation key 1022 and the third operation key 1023 may be rocker switches distributed on an upper surface of a front part of the operator 102, the fourth operation key 1024 may be a trigger switch disposed under a rear part of the operator 102, and the five operation keys 1025 may be a trigger switch disposed above the rear part of the operator 102 and opposed to the fourth operation key 1024. Specifically, the first operation key 1021 is a master switch, the second operation key 1022 is a start switch, the third operation key 1023 is a flameout switch, the fourth operation key 1024 is a fuel supply adjustment switch, and the fifth operation key 1025 is a fuel supply lock switch. When a user is gonging to use the grass trimmer, the master switch should be pressed firstly, so that a circuit system of the grass trimmer can be connected. Then the start switch can be pressed to make the controller 21 control the starting system to start the gasoline engine 2. During working, the user can apply different pressures on the fuel supply adjustment switch, then the controller 21 controls the fuel supply system 25 to adjust the fuel supply amount according to the state of the fuel supply adjustment switch; when the fuel supply doesn't need to be adjusted for a long time, the user can press the fuel supply lock switch, so the controller 21 locks the fuel supply amount according to the state of the fuel supply lock switch, and the fuel supply adjustment switch could be released. To finish working, the flameout switch can be pressed to make the controller 21 stop the gasoline engine 2. Finally the master switch can be pressed again to disconnect the circuit system of the grass trimmer.

As shown in FIGS. 6 and 16 to 19, the starting system 23 includes a starter motor 231 and a speed reduction unit 232. The starter motor 231 is disposed below the cylinder 2022 to avoid a high temperature region. The starter motor 231 includes a starter motor output shaft 2311. The starter motor output shaft 2311 extends rearward along the axial direction of the grass trimmer and is connected to an input gear 2321 of the speed reduction unit 232. An output gear 2323 of the speed reduction unit 232 passes through a clutch unit and is connected to a rear end of the crankshaft 204.

Figure 16:
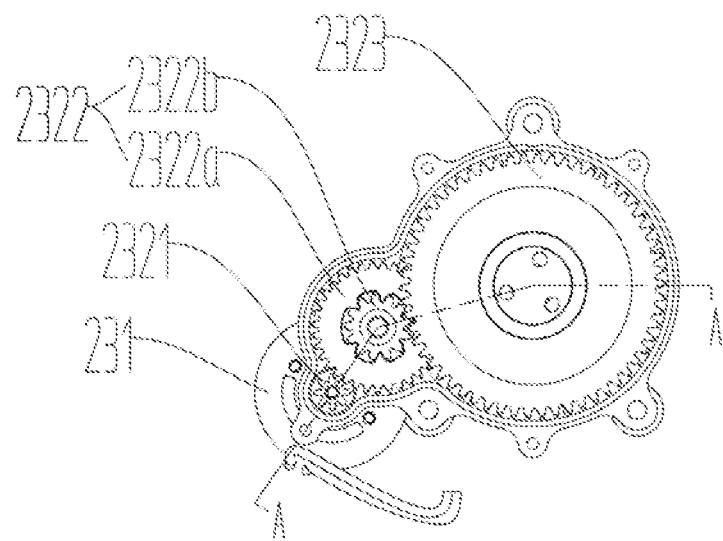
FIG. 16 is a structural diagram illustrating a structure of a speed reduction unit of the gasoline engine in FIG. 4.
Figure 17:
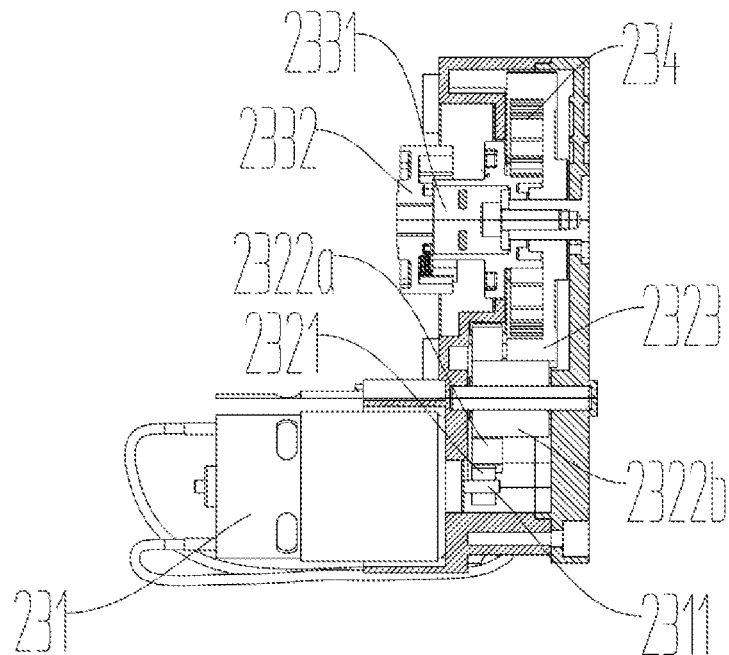
FIG. 17 is a cross-sectional view taken along line A-A of FIG. 16.

As shown in FIGS. 16 to 17, the speed reducing unit 232 may be multistage gears, at least including a transmission gear 2322 cooperating with the input gear 2321 and the output gear 2323 cooperating with the transmission gear 2322. The input gear 2321 is coaxially fixedly connected with the starter motor output shaft 2311, and the input gear 2321 is rotated at the same angular velocity as the starter motor output shaft 2311. The transmission gear 2322 includes a first tooth section 2322a meshing with the input gear 2321, and a second tooth section 2322b disposed coaxially with the first tooth section 2322a and meshing with the output gear 2323. The diameter of the second tooth section 2322b is larger than the diameter of the input gear 2321, and is smaller than the diameter of the first tooth section 2322a. At the same time, the diameter of the first tooth section 2322a is smaller than the diameter of the output gear 2323. In an embodiment, the first tooth section 2322a and the second tooth section 2322b may be integrally formed. In another embodiment, the first tooth section 2322a and the second tooth section 2322b may be separately disposed, as long as both of which are synchronously rotated at the same angular velocity.

Figure 18:
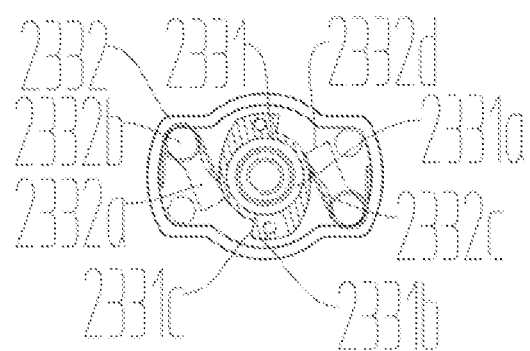
FIG. 18 is a structural diagram illustrating structures of a ratchet wheel and a clutch drum in FIG. 17.

As shown in FIG. 17 to FIG. 18, the clutch unit may include a clutch drum 2332 disposed on the crankshaft 204, and a ratchet wheel 2331 contacting with or departing from the clutch drum 2332 and driven by the output gear 2323. The clutch drum 2332 includes a disk body section which is substantially rectangular shaped, a pair of pawls 2332a disposed on opposite corners of the disk body section, and a pair of torsion springs 2332c respectively sleeved on the pawls 2332a. The pawl 2332a includes a pawl shaft 2332b sleeved by the torsion spring 2332c, and a contact surface 2332d at an end away from the pawl shaft 2332b. The disk body section includes a pair of partial curved faces oppositely disposed. The ratchet wheel 2331 is at least partially curved, and includes a ratchet cavity 2331a having a circular cross section, a pair of ratchet protrusions 2331b disposed outside the ratchet cavity 2331a and correspondingly engaged with on the pawls 2332a with unidirectional pressure, a fixing member disposed in a center of the cavity 2331a and coaxially fixed to the output gear 2323, and a gasket sleeved on the fixing member. Each of the ratchet protrusions 2331b includes a mating face 2331c that abuts against the contact face 2332d. Preferably, the contact surface 2332d and the mating surface 2331c are both planar. As shown in FIG. 18, in a clockwise direction, the ratchet protrusion 2331b abuts against the contact surface 2332d of the pawl 2332a through the mating surface 2331c, however in an anti-clockwise direction, since outer surface of the ratchet protrusion 2331b is at least partially curved, the ratchet protrusion 2331b and the pawl 2332a cannot abuts against each other and consequently separated from each other.

Figure 19:
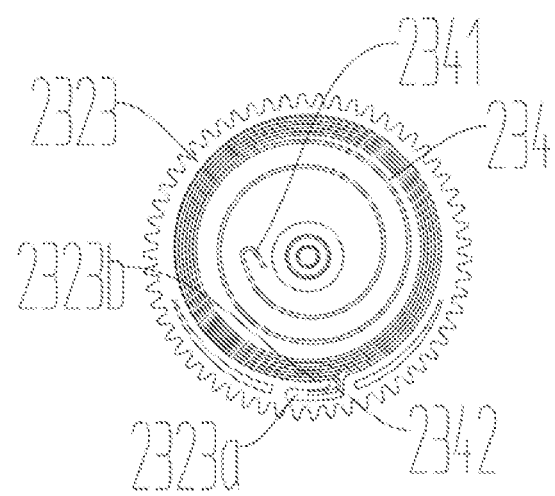
FIG. 19 is a structural diagram illustrating a structure of an energy storage member in FIG. 17.

As shown in FIG. 19, an energy storage member is preferably included and disposed inside the output gear 2323, and is preferably a coil spring 234, a center of which is coaxial with a center of the output gear 2323. The coil spring 234 can reduce impacts between components at a time of starting, so as to prolong service life of the starting system 23. The coil spring 234 includes an inner end 2341 disposed in an inner side and an outer end 2342 disposed in an outer side. A portion between the inner end 2341 and the outer end 2342 is multi-layer winded to store or release energy, and the portion winded can be contracted or expanded. The output gear 2323 includes a receiving groove 2323a disposed outside for receiving the outer end 2342 of the coil spring 234, and a hook 2323b disposed on a side of the receiving groove 2323a and engaged with the outer end 2342 of the coil spring 234. In another embodiment, the energy storage member may also be a torsion spring.

After the grass trimmer is started, the starter motor output shaft 2311 is rotated at a high speed to drive the input gear 2321 to rotate, the first tooth section 2322a is rotated by gear meshing, the second tooth portion 2322b coaxial with the first tooth section 2322a is also driven to rotate correspondingly, and the output gear 2323 is driven to rotate by gear meshing. As the output gear 2323 is rotated, pressure is continuously applied to the coil spring 234, and the coil spring 234 continuously stores the kinetic energy of the motor. Once the coil spring 234 provides a elastic force greater than a resistance force provided by the crankshaft 204, the coil spring 234 will release energy to the crankshaft 204 through the clutch unit. In this case, since the clutch drum 2332 can only be rotated in one direction, and one direction transmission is achieved to drive the crankshaft 204 to rotate, thus an electric start of the gasoline engine 2 is achieved. Once the gasoline engine 2 is started, the crankshaft 204 will be rotated at a high speed, and centrifugal force of the crankshaft 204 will disengage the clutch drum 2332 from the ratchet wheel 2331 to ensure that the high-speed rotation of the crankshaft 204 has no effect on the ratchet wheel 2331, so that the ratchet wheel 2331 can remain stationary and the speed reduction unit 232 is ensured to be stopped. As a result, a requirement for power of the starter motor 231 is small, a structure of the starter motor 231 is simple and reliable, cost is low, and a manual starting device is not needed. Since impacts between components are reduced by the energy storage member, service life of the starting system 23 is prolonged.

In an embodiment of the present disclosure, the DC power source 101 is disposed behind the speed reduction unit 232, a crankcase 2014 is included and disposed in front of the speed reduction unit 232, both the starter motor 231 and the crankshaft 204 are connected to a front part of the speed reduction unit 232, and the controller 21 is disposed below the DC power source 101. By using this arrangement, a structure of the power section 11 of the grass trimmer is simplified, a shape of the grass trimmer is more attractive, and wiring is easier.

As shown in FIGS. 2, 6, 14 and 15, the ignition system 24 may include an boosting device 241, a spark plug 242 connected to an output end of the boosting device 241, and a second sensor 222 disposed on the flywheel 243 or the engine block 201. In an embodiment, the second sensor 222 includes inductive elements and a Hall element disposed corresponding to the inductive elements. The inductive elements are disposed on the flywheel 243 and are magnets, the number of the inductive elements is at least two, and the Hall element is disposed on the engine block 201 and the number of the Hall element is one. In another embodiment, the Hall element may also be replaced by a photoelectric element or another component alike. There is a combustion chamber within the cylinder 202, and the spark plug 242 is fixed to the cylinder 202 and at least partially extends into the combustion chamber. Preferably, the inductive element may include a positioning magnet 2432 for initial positioning, and a measuring magnet 2431 for rotational speed measurement. The positioning magnet 2432 is also referred to as a top dead center positioning magnet. The inductive elements are disposed in the circumferential direction of the flywheel 243. In an embodiment, the gasoline engine 2 further includes a third sensor, and the third sensor is a temperature sensor for collecting an ambient temperature signal.

In an embodiment of the present disclosure, the boosting device 241 raises an output voltage of the lithium-ion battery pack to an ignition voltage to provide sufficient energy for igniting air-fuel mixture. The output voltage of the lithium-ion battery pack is 6 V to 12 V, and the ignition voltage is 10,000V to 30,000V. Preferably, the boosting device 241 may include multi-stage boosting modules. In an embodiment, the boosting device 241 includes a primary boosting module and a secondary boosting module. The primary boosting module raises the output voltage of the lithium-ion pack to 200 V-250 V, and the secondary boosting module raises the output voltage from 220V to 250V to the ignition voltage. Specifically, in an embodiment, the output voltage of the lithium-ion battery pack is 6V or 7.2 V, and the boosting device 241 firstly raises the output voltage of the lithium-ion battery pack to 220 V by using series inductance, and then raises the output voltage of 220V to the ignition voltage, which is 15,000 V to 30,000 V.

Figure 25:
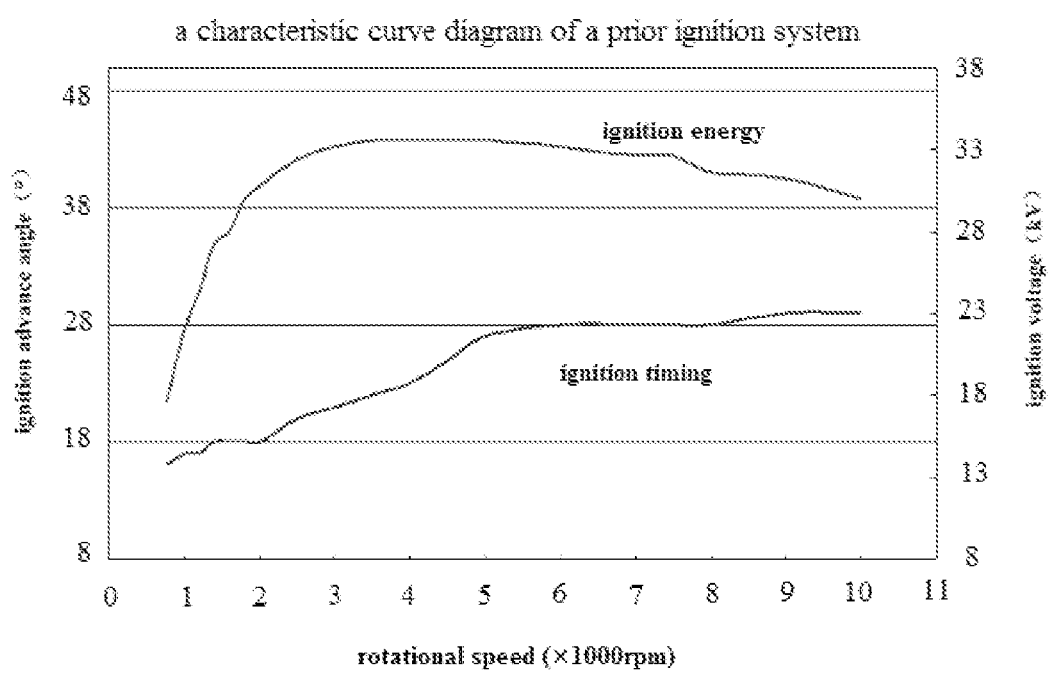
FIG. 25 is a characteristic curve diagram of a prior ignition system.
Figure 26:
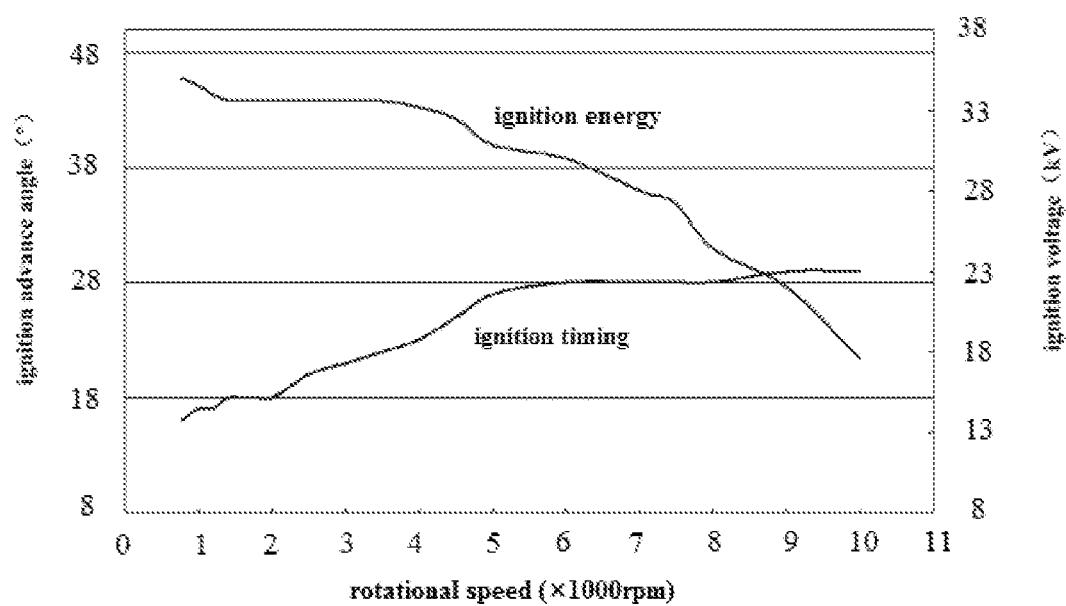
FIG. 26 is a characteristic curve diagram of an ignition system in an embodiment of the present disclosure.

In an embodiment of the present disclosure, the lithium-ion battery pack is used as the DC power source 101, a rotational speed of the flywheel 243 is detected by the second sensor 222 to determine an ignition advance angle, a current temperature is detected by the third sensor, and the controller 21 raises the output voltage of the DC power source 101 through the boosting device 241. The controller 21 calculates the ignition advance angle and the ignition voltage currently required according to current operating conditions of rotating speed, working time, temperature and the like, and then the ignition system 24 generates an electric spark of corresponding energy through the spark plug 242, according to an internal calculation result of the controller 21. The electric spark causes the air-fuel mixture in the cylinder 202 to burn, so as to push the piston 203 to reciprocate, thus the grass trimmer can work in an ideal working state. This allows ignition to be achieved at a very low speed, specifically, the current temperature can be detected by a temperature sensor and the ignition voltage is raised when the current temperature is low. Meanwhile, the ignition advance angle and the ignition voltage are also controlled by the controller, the ignition process can be triggered when the air-fuel mixture in the cylinder 202 is at the highest concentration, so that a maximum spark can be generated to make the start of the gasoline engine 2 easier and higher efficient. Compared with the prior magneto technology solution, installation of a bulky magnet module on blades of the flywheel is not required, which can reduce the weight of the blades, so that the power output by the gasoline engine is less consumed on the blades and the overall efficiency of the system is improved. At the same time, the ignition advance angles at different rotational speeds can be controlled at optimal states by detecting the rotational speed in advance, so that working efficiency of the gasoline engine system at all speed states can be improved. Furthermore, by using the controller to precisely control the ignition advance angle and voltage, when the load of the gasoline engine changes drastically, compared with the prior ignition system (as shown in FIG. 25), the controller provided by embodiments of the present disclosure can adjust the ignition advance angle in time by executing program algorithm with reference to positions and rotational speeds of the flywheel measured by a sensor. The obtained relationship among ignition timing, ignition voltage and rotational speeds is shown in FIG. 26, which makes the grass trimmer work more stable.

As shown in FIGS. 6 to 13, in an embodiment of the present disclosure, the gasoline engine 2 may be a carburetor type gasoline engine, and the fuel supply system 25 may include a carburetor 254, an automatic choke control unit 251, and an automatic fuel throttle control unit 252. The carburetor 254 includes an intake passage 2541 with an intake port, and the automatic choke control unit 251 and the automatic fuel throttle control unit 252 are disposed on the carburetor 254.

The automatic choke control unit 251 includes a choke shaft 2515 and a choke valve 2511 mounted on the choke shaft 2515, and the choke valve 2511 is used to open or close the intake passage 2541. The automatic choke control unit 251 further includes a choke actuator 2512 and a choke transmission unit connected to the choke actuator 2512, and the choke transmission unit is mated with the choke shaft 2515. In an embodiment, the choke valve 2511 is coaxially rotated with the choke shaft 2515, and the opening and closing of the intake passage 2541 may also be achieved through reciprocating movements of the choke valve 2511. The choke shaft 2515 penetrates into the intake passage 2541 of the carburetor 254 and is fixedly or detachably connected to the choke valve 2511, so that the choke valve 2511 can be rotated coaxially with the choke shaft 2515. The choke valve 2511 is located in the intake passage 2541 and can be used to open the intake passage 2541 to let air enter the cylinder 202. The carburetor 254 further includes a self-locking unit used to lock the choke valve 2511 and an unlocking unit used to unlock the choke valve 2511. Since the self-locking unit can be found in the prior art, and the unlocking unit can unlock the self-locking unit by means of refueling, which is also a prior art, structures of the self-locking unit and the unlocking unit will not be described in detail.

The choke transmission unit includes a passive cam 2514 sleeved on the choke shaft 2515, and an active cam 2513 that cooperates with the passive cam 2514 and is connected to an output end of the choke actuator 2512. The active cam 2513 includes an active cam axle hole 2513b sleeved on the output end of the choke actuator 2512, and a projection 2513a coordinating with the passive cam 2514, the extending direction of the projection 2513a being parallel to the axial direction of the choke shaft 2515. The passive cam 2514 includes a passive cam axle bore 2514a sleeved on the choke shaft 2515. In an embodiment, the choke transmission unit may indirectly drive the choke valve 2511 through the choke shaft 2515, or may directly drive the choke valve 2511. The structures of the passive cam 2514 and the active cam 2513 used in above embodiment of the present disclosure are simple, reliable and low-cost, however the driving manner of the choke transmission unit may also apply a belt, a chain, a hinge or a pendulum to achieve an object of the present disclosure.

The choke actuator 2512 may be an electric motor, a combination of an electric motor and a reduction gearbox, an electromagnetic device, or a pneumatic device. The electric motor may be a DC or AC motor workable in forward and reverse directions, also called as a servo motor. In an embodiment, a DC servo motor is preferred to achieve a small structure, large torque, and programmable control.

The choke valve 2511 and the passive cam 2514 are fixed to the same choke shaft 2515, and are rotatable with the choke shaft 2515. The choke shaft 2515 is installed in the intake passage 2541 inside the carburetor 254 and can be rotated. Therefore, as long as the passive cam 2514 is rotated, the choke valve 2511 can be rotated by the choke shaft 2515, thus an air intake amount can be adjusted. When the choke valve 2511 is closed by using the passive cam 2514, the choke valve 2511 is maintained in a closed state by the self-locking unit of the carburetor 254. When the throttle being raised, the self-locking unit is unlocked, and the choke valve 2511 is opened. Afterwards, the choke actuator 2512, which may be a motor workable in forward and reverse directions, can drive the active cam 2513 to rotate, and the active cam 2513 can further drive the passive cam 2514 to rotate to close the choke valve 2511. When the gasoline engine 2 is to be started, the motor works forwardly to drive the driving cam 2513 to drive the passive cam 2514 to close the choke valve 2511. Once the choke valve 2511 is totally closed, the motor will work reversely and reset, so that the motor is disconnected from the choke transmission unit, and the choke valve 2511 will be maintained in the closed state by the self-locking unit. After the gasoline engine 2 is started, when the throttle being raised, the self-locking unit is unlocked, and the choke valve 2511 is restored to an open state. Thus it can be seen that the entire control process above can be executed automatically.

The automatic fuel throttle control unit 252 includes a throttle shaft 2526 and a throttle 2521 mounted on the throttle shaft 2526. The throttle 2521 is used to open or close the intake passage 2541. The automatic fuel throttle control unit 252 further includes a throttle actuator 2522 and a throttle transmission unit connected with the throttle actuator 2522. The throttle transmission unit is also connected to the throttle shaft 2526.

The throttle transmission unit cooperates with an end of the throttle shaft 2526 through a throttle cable 2524, and the throttle 2521 is rotated coaxially with the throttle shaft 2526. In an embodiment, the throttle cable 2524 may be a substantially rigid rod. In another embodiment, the throttle cable 2524 may be a flexible rod or wire. The throttle transmission unit includes a rack 2525 fixed to the throttle cable 2524, and a throttle drive gear 2522b cooperating with the rack 2525 and connected to an output end of the throttle actuator 2522. Or, the throttle transmission unit may directly cooperate with an end of the throttle shaft 2526, which can also achieve the object of the present disclosure. The rack and gear transmission structure applied by the throttle transmission unit in above embodiment of the present disclosure is simple, reliable, and low-cost, however the driving manner of the throttle transmission unit may also apply a belt, a chain, a hinge or a pendulum to achieve an object of the present disclosure.

In an embodiment, the automatic fuel throttle control unit 252 further includes a rotating end 2523 and a locking end 2527 respectively located at opposite ends of the throttle shaft 2526. The rotating end 2523 is fixed to the throttle cable 2524, and the locking end 2527 cooperates with the automatic choke control unit 251. When the throttle 2521 is opened, the choke valve 2511 is also driven to open, thereby achieving linkage between the throttle 2521 and the choke valve 2511. The rotating end 2523 is at least partially arcuate and includes a plurality of fixing holes 2523a arranged in an arc shape, wherein one fixing hole 2523a is fastened to an end of the throttle wire 2524.

The throttle actuator 2522 may be an electric motor, a combination of an electric motor and a reduction gearbox, an electromagnetic device, or a pneumatic device. The electric motor may be a DC or AC motor workable in forward and reverse directions, also called as a servo motor. In an embodiment, a DC servo motor is preferred to achieve a small structure, large torque, and programmable control.

Figure 12:
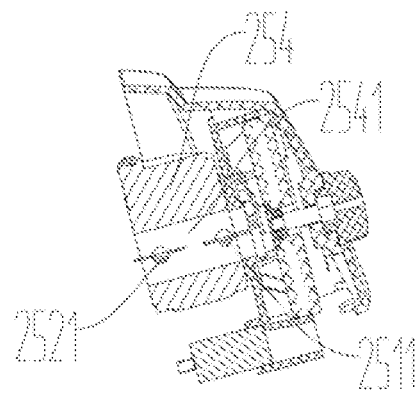
FIG. 12 is a structural diagram illustrating a structure of the gasoline engine in FIG. 7 in a high speed state.
Figure 13:
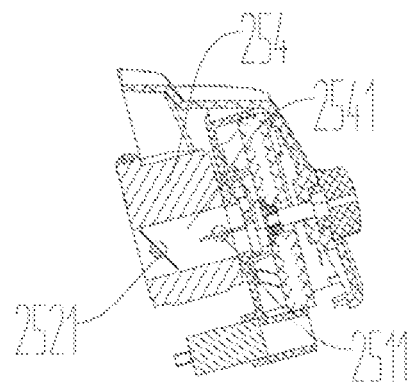
FIG. 13 is a structural diagram illustrating a structure of the gasoline engine in FIG. 7 in an idling state.
Figure 14:
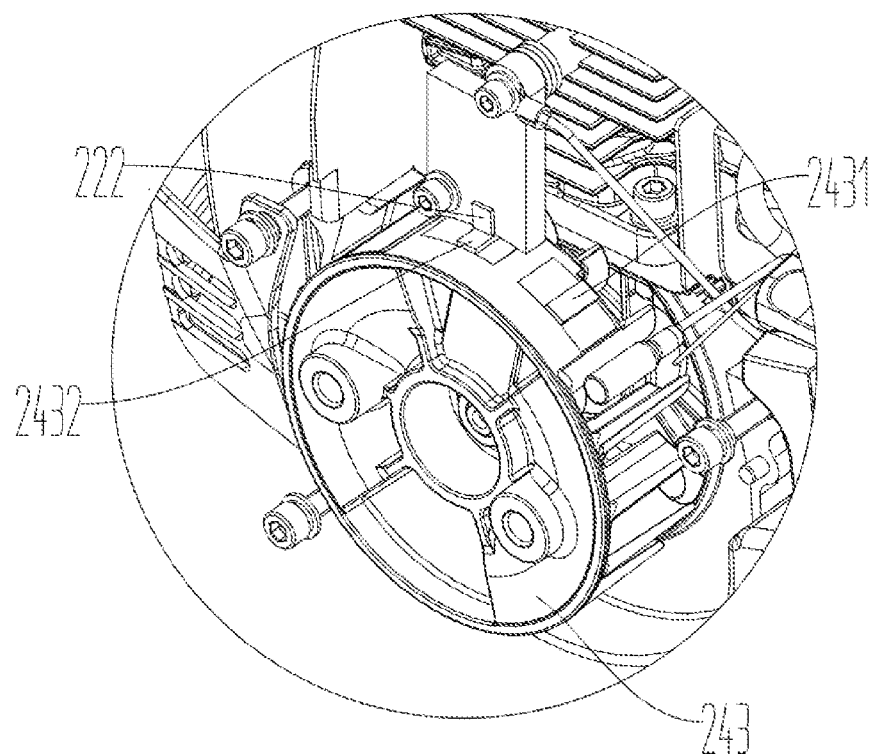
FIG. 14 is a partial enlarged view illustrating a structure of the flywheel of the gasoline engine in FIG. 4.
Figure 15:
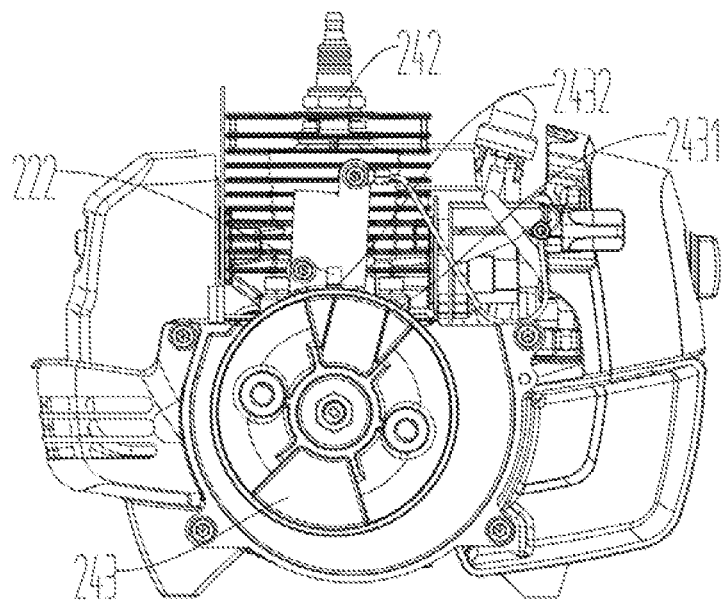
FIG. 15 is a structural diagram illustrating a structure of a side of the gasoline engine in FIG. 4 in which the flywheel disposed.

The throttle 2521 is fixed to the throttle shaft 2526 and is rotatable with the throttle shaft 2526, and the throttle shaft 2526 is mounted in the intake passage 2541 inside the carburetor 254. When the gasoline engine 2 is in an idling state, as shown in FIG. 13, the throttle 2521 is in a closed state. The controller 21 controls the throttle actuator 2522 to operate, and drives the throttle drive gear 2522b to rotate by a throttle output shaft 2522a, thereby driving the rack 2525 to perform linear motion, and further driving the throttle cable 2524 to perform linear motion. Since the throttle cable 2524 is connected to the rotating end 2523, the rotating end 2523 drives the throttle shaft 2526 at the center thereof to rotate together, so that the throttle 2521 is opened. Then the locking end 2527 drives the choke valve 2511 to open and air income is increased, so that the gasoline engine 2 enters into a high speed state, as shown in FIG. 12, and automatic control of the automatic choke control unit 251 and the automatic fuel throttle control unit 252 is achieved. In an embodiment of the present embodiment, the gasoline engine 2 further includes a first sensor 221, which is a temperature sensor for measuring an ambient temperature. In another embodiment, the first sensor 221 and the third sensor may be integrated into one sensor. By measuring the ambient temperature through the first sensor 221 in advance, once the ambient temperature is lower than a preset value, the fuel concentration of the air-fuel mixture inhaled into the combustion chamber will be increased, and an amount of air inhaled into the carburetor 254 is reduced. Therefore, the controller 21 controls the motor to work to close the choke valve 2511, and, and the choke valve 2511 and the throttle 2521 are opened automatically when the gasoline engine 2 returns to normally working. It can be seen that the whole process is simple and convenient, and starting states of the gasoline engine 2 can be automatically set in various starting environments, which reduces users' intervention on the start of the gasoline engine 2, and also reduces users' labor intensity.

Based on above specific structures, a controller is applied by embodiments of the present embodiment to control the grass trimmer, and a battery pack is used to supply power to the grass trimmer through the controller, so that operation of the grass trimmer can be more convenient and more easy, and a concentrated operation device (e.g. a control panel) can be used to control the grass trimmer conveniently. Moreover, the use of the controller can improve the cooperation of various systems, so that the grass trimmer can be maintained in the best working condition. For example, when the grass trimmer is started, the controller can perform unified control of a starting system, a fuel supply system and an ignition system, according to commands issued by a user and the working condition signal collected by sensors, so that optimal matching parameters can be achieved among the systems, and the parameters can be automatically adjusted according to changes of working conditions. In the prior art, since a battery pack of a prior electric start grass trimmer only supplies power for the starting system during a starting phase, and the ignition system gets power from an additional generator during a normal working phase, utilization of the battery pack is extremely low and product cost is increased. However in the present disclosure, a single battery pack is used to power the entire grass trimmer including the starting system and the ignition system, which improves the utilization of the battery pack and reduces the product cost.

Embodiment 2

The difference from Embodiment 1 lies in that the gasoline engine 2 of the present embodiment is an EFI (electronic fuel injection) gasoline engine. As shown in FIG. 3, the fuel supply system 25 may include an electric fuel injector 253. The controller 21 adjusts a fuel injection amount and an air-fuel ratio through the electric fuel injector 253, according to the ambient temperature signal measured by the first sensor 211.

Embodiment 3

Figure 20:
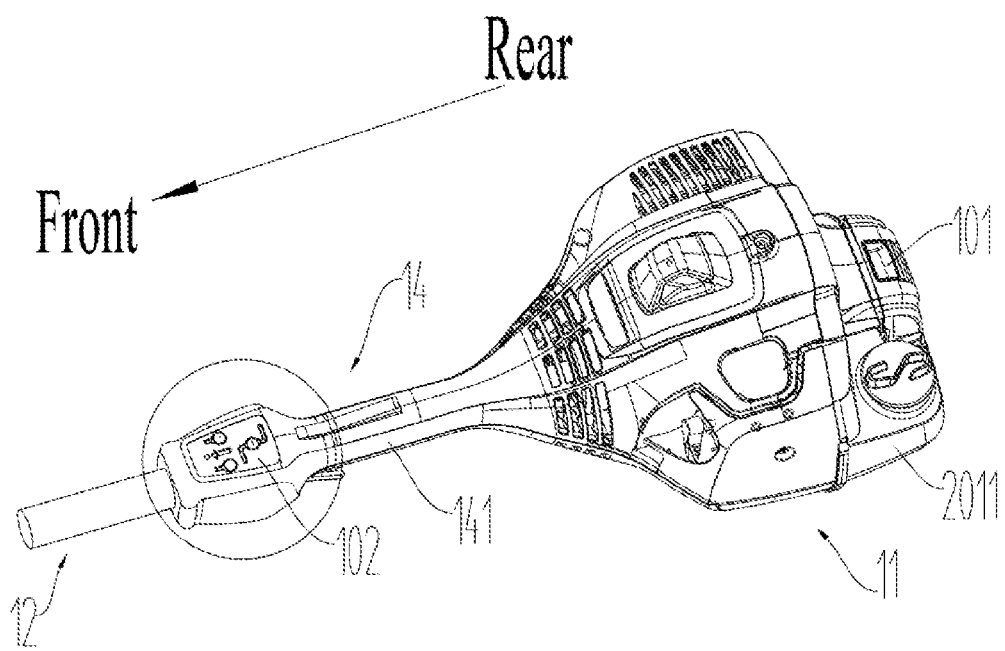
FIG. 20 is a structural diagram of a garden tool in another embodiment of the present disclosure.
Figure 21:
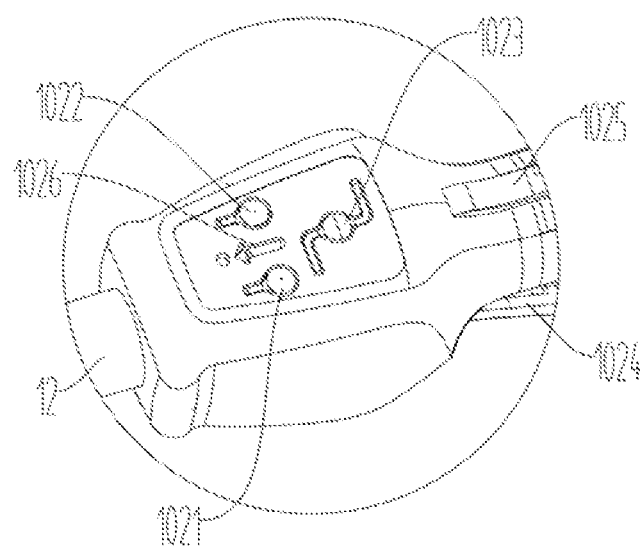
FIG. 21 is a partial enlarged view of FIG. 20.

As shown in FIGS. 20 to 21, the present embodiment provides a grass trimmer using a gasoline engine. The difference from Embodiment 1 lies in that the operator 102 includes a panel, and the first operation key 1021, the second operation key 1022 and the third operation key 1023 are flat push-button switch disposed on the panel. A convex portion 1026 is provided between the first operation key 1021 and the second operation key 1022 to prevent the first operation key 1021 and the second operation key 1022 from being pressed simultaneously.

When a user presses the panel from a top direction using a body section part (usually using a palm or a finger), if only the first operation key 1021 or the second operation key 1022 is pressed, the convex portion 1026 will not hinder the movement of the user's body section part. If the first operation key 1021 and the second operation key 1022 are pressed simultaneously by mistakes, the convex portion 1026 will hinder the movement of the user's body section part. On the one hand the first operation key 1021 and the second operation key 1022 are prevented from being pressed simultaneously, and on the other hand the convex portion 1026 may cause an unpleasant touch to user's body section part, alerting the user that this is an error operation. Due to the arrangement of the convex portion 1026, the distance between the first operation key 1021 and the second operation key 1022 can be further reduced, thereby reducing entire area of the panel or providing more installation and operation space for other components on the panel. Normally speaking, in order to prevent two operation keys being pressed simultaneously, the distance between the two operation keys 102 is increased. For operation keys 102 generally designed to be pressed by a thumb, spacing between inner sides of the first operation key 1021 and the second operation key 1022 should be not less than 25 mm. However, since the convex portion 1026 is provided in the embodiment, the spacing between inner sides of the first operation key 1021 and the second operation key 1022 can be not less than 20 mm. Furthermore, when the first operation key 1021 and the second operation key 1022 are selected as push-button switches, the spacing between inner sides of the two can be not less than 6 mm. When the first operation key 1021 and the second operation key 1022 are selected as the rocker switches, the spacing between inner sides of the two can be not less than 12 mm. Of course, selections of the first operation key 1021 and the second operation key 1022 are not limited to above types of switches, so the spacing between inner sides of the two may also be specifically adjusted according to the types of switches selected.

Embodiment 4

Figure 22:
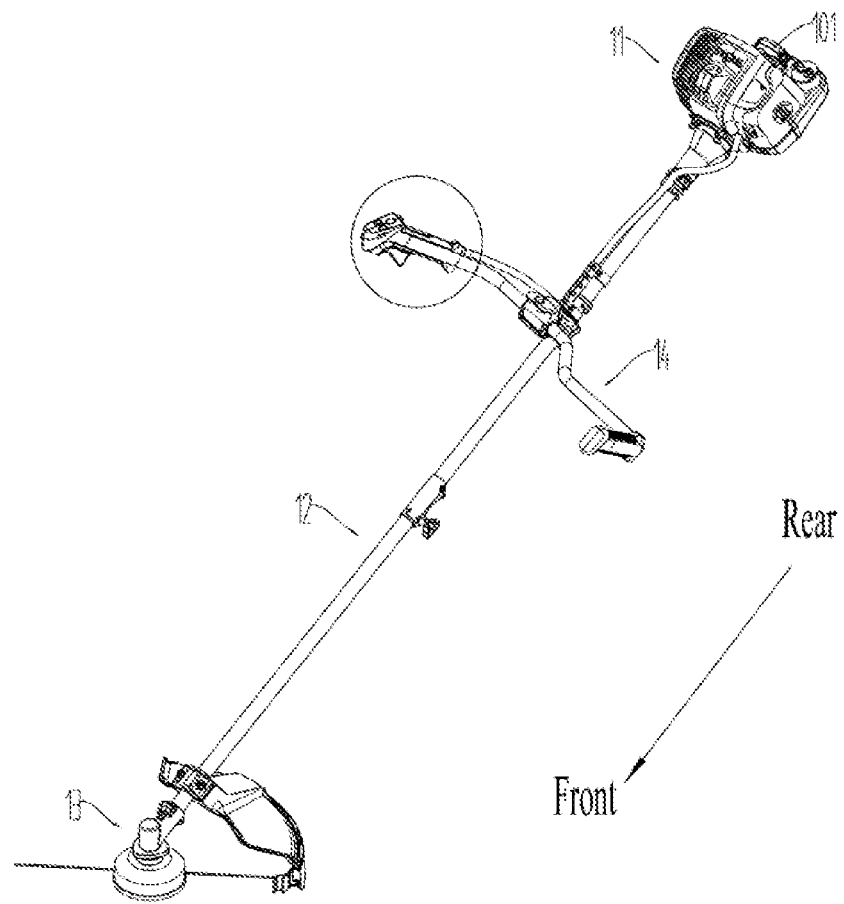
FIG. 22 is a structural diagram of a garden tool in another embodiment of the present disclosure.
Figure 24:
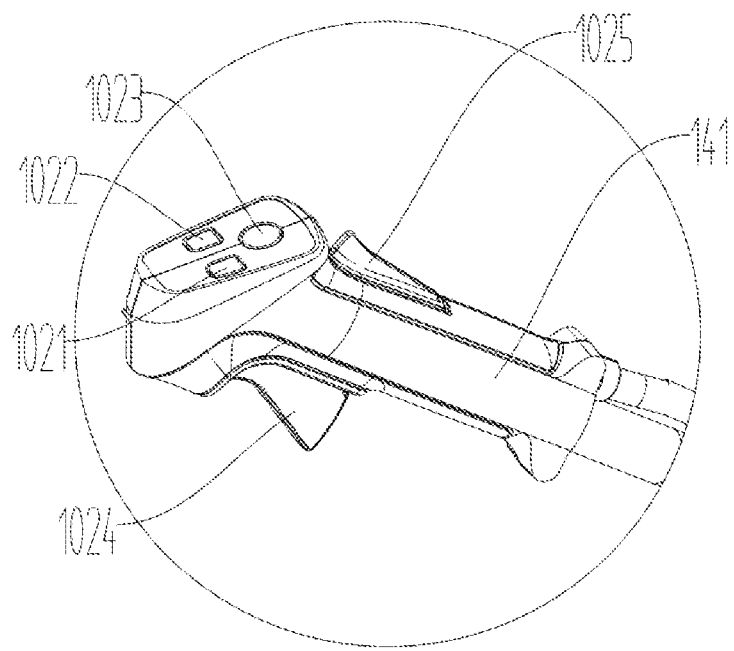
FIG. 24 is a partial enlarged view of FIG. 22 in another embodiment of the present disclosure.

As shown in FIGS. 22 and 24, the difference from Embodiment 3 lies in that the handle section 14 of the grass trimmer in the present embodiment is a U-shaped handle mounted on the linkage section 12, and two grip portions 141 are respectively included at both ends of the U-shaped handle. The operator 102 is disposed on one of the two grip portions 141.

Embodiment 5

Figure 23:
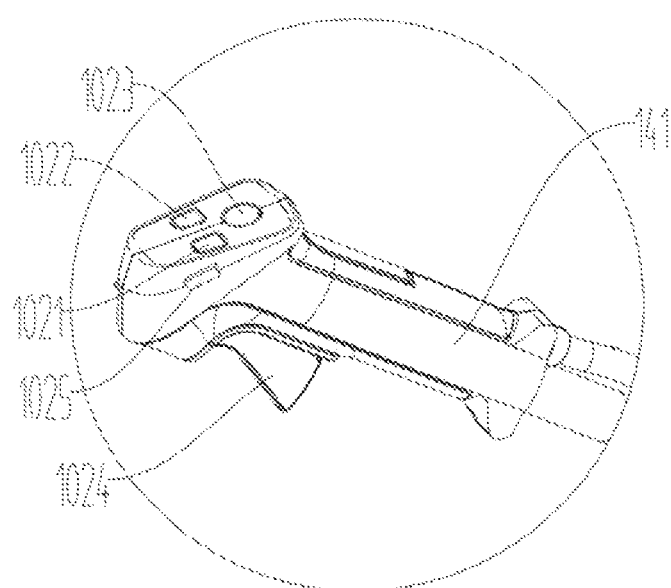
FIG. 23 is a partial enlarged view of FIG. 22 in an embodiment of the present disclosure.

As shown in FIGS. 22 and 23, the difference from Embodiment 4 lies in that, in the operator 102 of the grass trimmer provided by this embodiment, the fifth operation key 1025 is disposed below a side of the panel. In the present embodiment, the fifth operation key 1025 is a fuel supply lock switch.

It should be understood that although the specification is described according to the embodiments, but not each embodiment includes only one independent technical solution. The description of the specification is merely for the sake of clarity, those skilled in the art should take the specification as a whole and the technical solutions in the embodiments may also be combined as appropriate to form other embodiments that can be understood by those skilled in the art.

The detailed descriptions set forth above are merely for the specific description of possible embodiments of the present disclosure, and are not intended to limit the protection scope of embodiments of the present disclosure, any equivalent implementation manner without departing from the technical spirit of the present disclosure or any changes should be included in the protection scope of the present disclosure.

What is claimed is:

1. A garden tool comprising:
a gasoline engine including a fuel supply system and an ignition system;
a control system including at least one sensor used for collecting a working condition signal of the gasoline engine and a controller used for receiving the working condition signal and controlling the fuel supply system and the ignition system according to the working condition signals received, the control system further including an operator used for being physically operated by a user to issue a user command signal, and the controller receiving the user command signal and performing at least one of the following control actions on the gasoline engine: starting, flameout, and adjusting a fuel supply amount based on the user command signal received; and
a starting system including a starter motor, a speed reduction unit, and a clutch unit, the gasoline engine further including a crankshaft;
wherein when the gasoline engine is started, the starter motor drives the crankshaft to rotate through the speed reduction unit;
wherein the clutch unit is used for one-way transmitting torque of the starter motor and is disposed between the speed reduction unit and the crankshaft;
wherein the speed reduction unit is a gear set including an input gear, an output gear, and at least one transmission gear disposed between the input gear and the output gear; and
wherein when the gasoline engine is started, an output shaft of the starter motor drives the input gear to rotate at a same speed, the input gear and the output gear meshes with each other and perform a speed reduction movement, and the output gear drives the crankshaft to rotate at a same speed through the clutch unit.

2. The garden tool according to claim 1, wherein the control system includes a first sensor used for measuring a first ambient temperature signal, and the controller adjusts a fuel supply amount and an air-fuel ratio according to the first ambient temperature signal;
wherein the fuel supply system includes a carburetor and an automatic choke control unit, the carburetor includes an intake passage, the automatic choke control unit includes a choke valve used for at least partially closing the intake passage and a choke actuator used for driving movement of the choke valve, and the controller controls the movement of the choke valve through the choke actuator so as to control an air amount throughout the carburetor; and
wherein the fuel supply system further includes an automatic fuel throttle control unit, the automatic fuel throttle control unit includes a throttle used for at least partially closing the intake passage and a throttle actuator used for driving movement of the throttle, and the controller controls the movement of the throttle through the throttle actuator so as to control a fuel amount throughout the carburetor.

3. The garden tool according to claim 1, wherein the fuel supply system includes an electric fuel injector, the at least one sensor includes a first sensor used for measuring a first ambient temperature signal, and the controller adjusts a fuel injection amount and an air-fuel ratio according to the first ambient temperature signal.

4. The garden tool according to claim 3, wherein the at least one sensor further includes a second sensor used for measuring a rotational speed signal of the gasoline engine and a third sensor used for measuring a second ambient temperature signal, the controller adjusts at least one of an ignition voltage and an ignition advance angle according to the rotational speed signal and the second ambient temperature signal, the ignition system includes a boosting device and a spark plug connected to an output end of the boosting device, the gasoline engine further includes a flywheel, and the second sensor is disposed on the flywheel.

5. The garden tool according to claim 1, wherein the speed reduction unit further includes an energy storage member used for storing kinetic energy of the starter motor and releasing energy to the crankshaft.

6. The garden tool according to claim 5, wherein the energy storage member is one of a coil spring and a torsion spring mounted on the output gear, and a free end of the energy storage member is able to be rotated relatively to another free end of the energy storage member as the output gear being rotated.

7. A garden tool comprising:
a gasoline engine including a fuel supply system and an ignition system;
a lithium-ion battery; and
a control system including at least one sensor used for collecting a working condition signal of the gasoline engine and a controller used for receiving the working condition signal and controlling the fuel supply system and the ignition system according to the working condition signal received;
wherein the lithium-ion battery is connected to the controller and provides power supply for the fuel supply system, the ignition system, and the control system through the controller;
wherein the ignition system includes a boosting device used for raising an output voltage of the power source of 6 V to 12 V to an ignition voltage of 15,000V to 30,000V, the boosting device including multi-stage boosting modules, the output voltage of the power source being raised to the ignition voltage by the multi-stage boosting modules.

8. The garden tool according to claim 7, wherein the gasoline engine includes an engine block, the fuel supply system and the ignition system are disposed in the engine block, and the lithium-ion battery pack is detachably mounted on the engine block.

9. The garden tool according to claim 7, wherein the multi-stage boosting modules include a primary boosting module and a secondary boosting module, the primary boosting module raises the output voltage of the power source to 200 V-250 V, and the secondary boosting module raises the output voltage from 220V to 250V to the ignition voltage.

10. The garden tool according to claim 7, wherein the ignition voltage is 10,000V to 30,000V.

11. A garden tool comprising:
- a gasoline engine a starting system, a fuel supply system, and an ignition system;
- a lithium-ion battery pack; and
- a control system including at least one sensor used for collecting a working condition signal of the gasoline engine, an operator used for being physically operated by a user to issue a user command signal, and a controller used for receiving the working condition signal and controlling the fuel supply system and the ignition system according to the working condition signal received;
- wherein the controller also receives the user command signal and performs at least one of following control actions on the gasoline engine: starting, flameout, and adjusting a fuel supply amount based on the user command signal received;
- wherein the lithium-ion battery pack is connected to the controller and provides power supply for the fuel supply system, the ignition system, and the control system through the controller;
- wherein the gasoline engine includes a crankshaft, and the starting system includes a starter motor and a speed reduction unit;
- wherein when the gasoline engine is starting, the starter motor drives the crankshaft to rotate through the speed reduction unit; and
- wherein the lithium-ion battery pack is disposed at a side of the speed reduction unit, the crankshaft is disposed at another side of the speed reduction unit and relative to the lithium-ion battery pack, and the controller is disposed under the power source.

12. The garden tool according to claim 11, further comprising a power section, a handle section, and a linkage section; and
- wherein the controller is disposed in the power section, and the operator is disposed in at least one of the handle section and the linkage section.

13. The garden tool according to claim 12, wherein the operator is spaced from the garden tool.

14. The garden tool according to claim 12, wherein the operator includes a control panel and at least two operation keys disposed on the control panel, and a convex portion is provided between two adjacent operation keys.

15. The garden tool according to claim 12, wherein the operator communicates with the controller through one of a communication wire or wireless signals.

\* \* \* \* \*